Jan. 1, 1935. H. A. RISHEL 1,986,447
CONNECTER OR COUPLING
Filed June 9, 1933
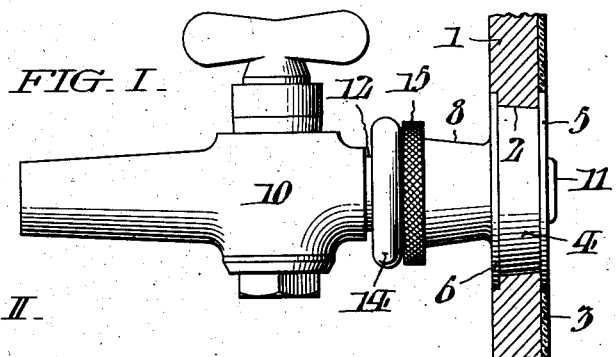
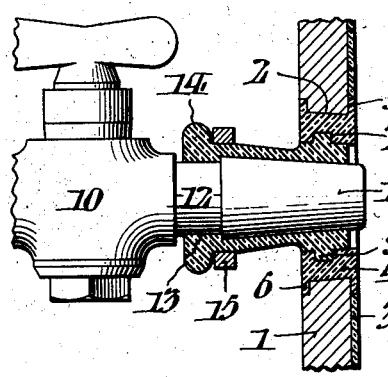
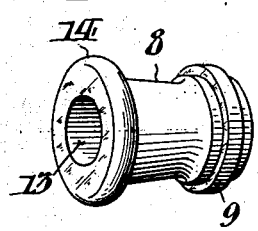
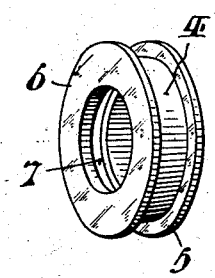
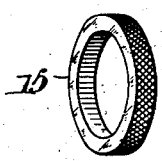
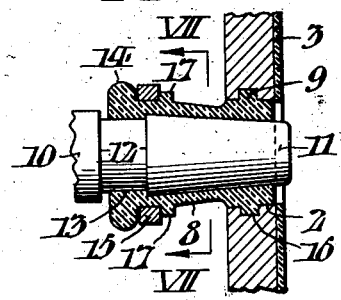
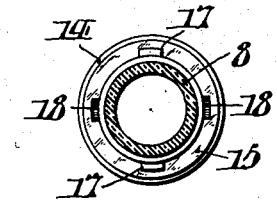
WITNESSES:
INVENTOR:
Harry A. Rishel,
BY
ATTORNEYS.

Patented Jan. 1, 1935

1,986,447

UNITED STATES PATENT OFFICE 1,986,447

CONNECTOR OR COUPLING

Harry A. Rishel, Ambler, Pa.

Application June 9, 1933, Serial No. 675,084

8 Claims. (Cl. 285—39)

This invention relates in its broader aspect to unions or jointures for securing together separable elements, while it has especial reference to connectors or couplings useful in attaching faucets or spigots to barrels, tanks, drums, carboy bottles, and chemical storage containers.

More particularly my invention refers to connectors or couplings made of rubber or similar material, which can be employed for securing a faucet or spigot to the outlet of a tank or other fluid container.

The primary object of this invention is to provide a connector or coupling of the noted character, whereby a jointure absolutely free from any leakage tendency is easily effected with a minimum expenditure of time and labor, and further without the aid of bolts, screw-threads or their equivalents, which are extremely objectionable from the standpoint of fostering deterioration and corrosion; such fastening means being also exceedingly impractical in connection with rubber lined containers.

Another object is to provide a simple and "foolproof" connector or coupling for attaching a spigot or turn-cock of hard rubber or glass to the conventional bung-hole of a barrel, or the outlet of rubber lined storage tanks and the like.

Specifically, I aim to provide a self-locking connector or coupling that will securely retain an emptying faucet or spigot in place, in the outlet of a rubber lined liquid container, with positive prevention of any leakage at the jointure; coupling and uncoupling of the parts being effected in a few seconds without the use of any tool or tools.

The stated and other incidental objects are attained by means of the structures, combinations and arrangements of parts hereinafter fully disclosed and claimed; and, in order that the same may be the better understood, reference is had to the accompanying sheet of explanatory drawing forming a part of this specification.

In the drawing:

Fig. I is a fragmentary section of a wooden tank, lined with rubber, showing my novel connector or coupling having an associated cock or spigot in secured position, said coupling and spigot being illustrated in elevation.

Fig. II is a somewhat similar view with the connector or coupling in longitudinal section, and the spigot fragmentarily broken away.

Fig. III is a perspective view of the connector or coupling.

Fig. IV is a similar view of an aperture liner or sleeve for locking my novel connector or coupling in the tank outlet.

Fig. V is a perspective view of a safety ring or auxiliary locking element, hereinafter fully explained.

Fig. VI is a sectional view, corresponding mainly with Fig. II, but showing a modified form of my invention; and, Fig. VII is a sectional view, taken as indicated by the arrows VII—VII in Fig. VI.

In all the views similar reference characters designate the same or corresponding parts.

In the embodiment of my invention shown by Figs. I to V, inclusive, the numeral 1 designates a side wall, of a conventionally constructed wooden tank, having an inwardly tapered outlet 2. The tank is conveniently, although not essentially, lined with a rubber or similar coating 3.

Fitting snugly in the tapering outlet 2 is an aperture liner or sleeve 4 of rubber, molded or otherwise suitably formed. This liner or sleeve 4 is held firmly in the side-wall 1 by suitable securing means, such as integrally-formed inner and outer flanges 5, 6, respectively. The joint between the wooden wall 1 and the inner flange 5 is protected by the coating of rubber 3 to properly seal it against injurious action of the tank contents; while said sleeve is provided with an inner rectangular-section groove 7, intermediate the flange ends 5, 6, for a purpose later on explained. The outer flange 6 is conveniently, although not essentially, inset flush with the outer face of the wall 1.

Adapted for coaction with the liner or sleeve 4 is a hollow collapsible rubber connector 8, having at one end of its varying diametric dimensions an enlargement with an encircling rib 9 of a diameter which is greater than the major diameter of the opening through the sleeve 4, in the tapering outlet 2, in which it is fitted. Attention is, at this juncture, particularly directed to the fact that the exterior dimensions at the ribbed end of the connector 8, relative to the liner or sleeve 4 are so predetermined that the two will properly register after said connector is inserted in place.

In order to insert the liner or sleeve 4, it is only necessary to collapse the same by pressure between the fingers to an extent sufficient to permit its passage into position in the tapering outlet 2, whereupon it will automatically expand into proper sealing relation therein.

Now as will be easily understood from Fig. II, after the liner or sleeve 4 is seated or secured in the tapering outlet 2, by a similar collapsing of the ribbed end of the connector 8, the latter can be easily inserted into place with the encircling rib 9 of similar section lockingly-engaged in the sleeve-groove 7. The thickness of the walls of the rubber connector 8, as well as its inherent pliability, obviously, is such as to permit said connector being contracted sufficiently to enter the liner or sleeve 4 in the manner stated.

Adapted for coaction with the connector 8 is the hard rubber or glass cock or spigot 10, having in its shank 11 an encircling rectangular-section groove 12, of a diameter slightly greater than an inner rectangular-section rib 13 molded in said connector's bore. Attention is particularly directed to the fact that the dimensions of the hard rubber spigot 10 and the groove 12, relative to the interior dimensions or bore of the connector 8, are so adjusted that the two will properly register after said spigot has been inserted. Furthermore, the dimensions of the connector 8 and the encircling rib 9 are such that, at this end, it is under compression; while the dimensions of said connector at the end with the rib 13 is under tension, which holds the spigot 10 firmly in place free from leakage. The locking effect of the rib 13 is further augmented by the provision of a circumferential rim 14, molded on the outside of the connector 8 to increase the pressure between the groove 12 of the spigot 10 and the rib 13 of said connector. It will be obvious that when the spigot 10 is in position, the connector 8 is locked in the outlet liner or sleeve 4 at one end, while the connector 8, at the other end, locks said spigot in place.

While the inherent resiliency of the rubber connector 8, reinforced by the rim 14, holds the spigot 10 in place, as a precautionary measure, on account of the corrosive nature of certain liquids frequently contained in such tanks, should the spigot 10 be subject to an unusually hard blow or pull, I prefer to supply the connector 8 with a safety ring 15. This ring 15 is forced over the connector 8 before it is inserted in the aperture liner or sleeve 4; and it is conveniently made of metal such as brass or any other desirable substance which is relatively non-yielding in character. The inside diameter of the ring 15 is the same or a shade less than the outside diameter of the connector 8 where it is adjacent to the lip or rim 14, after the spigot 10 has been pushed into place. Before the spigot 10 has been inserted, the safety ring 15 is positioned on the connector 8 away from the rim 14 as far as possible, whereupon said spigot is inserted and the ring 15 pushed up against the rim 14, which incidentally acts as a stop. It is obvious that the spigot 10 is now, what may be termed, "double-locked" in the connector 8, as it is impossible to get the rib 13 up over the side-walls of the groove 12, which is necessary before said spigot can be withdrawn from the connector 8.

While the safety ring 15, just described, is continuous throughout its circumference, it is evident it may be split at any one point of its circumference and still function, provided thereafter its rigidity has not been so weakened, that it can be sprung sufficiently to allow the rib 13 to ride up over the side walls of the groove 12.

To remove the spigot 10 from the connector 8, the safety-ring 15 is first pushed back towards the tank outlet 2, then by exerting the necessary force on said spigot, the rib 13 rides up over the side walls of the groove 12, whereupon said spigot may be easily withdrawn. The connector 8 is then pulled out from the tank-outlet liner or sleeve 4, by collapsing it between the fingers to disengage the rib 9 from the groove 7 in said sleeve, and then pulling outwardly.

In the modified form of my invention shown in Figs. VI and VII, the aperture liner or sleeve 4 is dispensed with, and the tapering outlet 2 provided with a rectangular-section groove 16, for reception of the connector encircling rib 9, in an obvious manner. In addition thereto the connector 8 is provided with one or more radially-directed exterior lugs or projections 17, for passage through registrable correspondingly-configured notches or grooves 18, longitudinally of the safety ring bore. Now it will be readily apparent that, after the safety ring 15 is forced into abutment with the connector circumferential rim 14, by imparting a quarter turn, for example, to said safety ring, the grooves 18 will be moved out of registration with the projections 17, bayonet-fashion; whereupon the safety ring 15 will be "double-locked", as it is impossible to now force the side wall of the spigot shank groove 12 over the connector rib 13.

While the foregoing description has made reference to an emptying cock attached to the outlet of a rubber-lined barrel, or storage tank, it is equally apparent that my invention is likewise applicable to glass bottles, or carboy bottles, steel drums, and other containers; hence I do not desire to limit myself to the precise details of construction set forth and shown; but include herein such other forms of the invention as may be effected by those conversant with the art, providing such other forms be within the scope of the following claims.

Having thus described my invention, I claim:

1. The combination with a container tapering outlet and a flow controlling means of a rubber or similar-material tubular connector-coupling with an exterior enlargement at one end embodying an angular-section encircling rib, said formation being of a diameter greater than the major diameter of the tapering outlet for sealing engagement under compression with a corresponding-section groove in the outlet, and a similar-section interior formation at the other end of the connector-coupling for engagement with the flow controlling means under tensile action.

2. The combination with a container tapering outlet and a flow controlling means of a rubber or similar-material tubular connector-coupling with an exterior enlargement at one end embodying an angular-section encircling rib, said rib being of a diameter greater than the major diameter of the tapering outlet for sealing engagement under compression with a corresponding-section groove in the tapering outlet, a similar-section interior formation at the other end of the connector-coupling for engagement with the flow controlling means under tensile action, and a rigid material non-yieldable ring adapted to securely embrace the connector-coupling to effect positive locking thereof to the flow controlling means.

3. The combination with a container having a tapering outlet and associated spigot of a rubber or similar-material connector-coupling with an exterior enlargement at one end embodying a rectangular-section encircling rib, said rib being of a diameter greater than the major diameter of the tapering outlet, for sealing engagement under compression in a correspondingly-sectioned groove in said outlet, a similar-section inner rib at the other end of the connector-coupling for engagement under tensile action with a corresponding-groove encircling the spigot shank, and a non-yieldable metal ring slidable exteriorly along the connector-coupling adapted to double-lock the last mentioned sealing connection.

4. The combination with a barrel having a tapering outlet orifice and associated spigot of a rubber or similar-material connector-coupling with an exterior enlargement at its inner end embodying a rectangular-section encircling rib, said rib being of a diameter greater than the major diameter of the tapering outlet, for sealing engagement under compression in a correspondingly-formed groove in said outlet orifice, a similar-section rib in the bore at the outer end of the connector-coupling for engagement with a suitable groove encircling the spigot shank under tensile action, a reinforcing circumferential rim at the connector outer extremity, and a non-yieldable metal ring slidable along the connector-coupling into abutment with the rim aforesaid to effect double-locking of the sealing jointure thereat.

5. The combination of claim 4 wherein the coupling connection is provided adjacent its outer end with radial projections, and the slidable ring has correspondingly-formed registrable grooves.

6. The combination of claim 4 wherein the tapering outlet is fitted with a rubber or similar-material liner embodying the connector-coupling rib-receiving groove.

7. As an article of manufacture a rubber or similar-material connector-coupling having an exterior enlargement at one end embodying a rectangular-section encircling rib of a diameter greater than that of the orifice into which it is to be inserted, and a similar-section interior rib within the connector-coupling bore at the other end, said latter rib being reinforced by a terminal encircling rim enlargement.

8. As an article of manufacture a rubber or similar-material connector-coupling with an exterior enlargement at one end embodying a rectangular-section encircling rib of a diameter greater than that of the orifice into which it is to be inserted, and a similar-section rib in the connector-coupling bore at the other end, said latter rib being reinforced by a terminal circumferential rim, and radial projections in spaced relation to said rim.

HARRY A. RISHEL.